(12) United States Patent
Benyo et al.

(10) Patent No.: US 8,135,516 B2
(45) Date of Patent: Mar. 13, 2012

(54) STEERING CONTROL APPARATUS FOR VEHICLE AND STEERING CONTROL METHOD

(75) Inventors: Imre Benyo, Budapest (HU); Marton Kuslits, Sopron (HU); Sandor Szucs, Parasznya (HU)

(73) Assignee: ThyssenKrupp Presta AG, Eschen (LI)

( * ) Notice: Subject to any disclaimer, the term of this patent is extended or adjusted under 35 U.S.C. 154(b) by 0 days.

(21) Appl. No.: 13/188,740

(22) Filed: Jul. 22, 2011

(65) Prior Publication Data

US 2012/0041645 A1 Feb. 16, 2012

(30) Foreign Application Priority Data

Aug. 11, 2010 (EP) ..................................... 10008377

(51) Int. Cl.
*B62D 6/10* (2006.01)
(52) U.S. Cl. .......................................... 701/42; 701/41
(58) Field of Classification Search ..................... 701/41, 701/42, 51, 61
See application file for complete search history.

(56) References Cited

U.S. PATENT DOCUMENTS

| | | | | |
|---|---|---|---|---|
| 5,141,069 A * | 8/1992 | Yasui | ............................. | 180/422 |
| 5,198,981 A * | 3/1993 | Collier-Hallman et al. | .... | 701/42 |
| 7,032,705 B2 * | 4/2006 | Zheng et al. | .................. | 180/446 |
| 7,974,751 B2 * | 7/2011 | Ito et al. | .......................... | 701/41 |
| 8,073,608 B2 * | 12/2011 | Hulten et al. | .................... | 701/91 |
| 2009/0271074 A1 * | 10/2009 | Hulten et al. | .................... | 701/42 |

FOREIGN PATENT DOCUMENTS

| | | |
|---|---|---|
| EP | 1645454 A1 | 4/2006 |
| EP | 1934083 A1 | 6/2008 |
| EP | 2093093 A2 | 8/2009 |

OTHER PUBLICATIONS

European Search Report issued in related European Application No. 10 00 8377 on Jan. 20, 2011.

* cited by examiner

*Primary Examiner* — Isam Alsomiri
(74) *Attorney, Agent, or Firm* — Connolly Bove Lodge & Hutz LLP

(57) ABSTRACT

A method for controlling a steering device with steering power support means for a motor vehicle with at least one steerable road wheel, where the steering device may include a steering shaft with a first end to adopt a steering wheel, a control device controlling said power support means, sensing means detecting steering shaft torque introduced in said steering shaft, and means to determine a hands-off situation in which the driver does not introduce a torque into said steering shaft, wherein the steering power support means support the driver on the basis of a driver demand introduced into the steering shaft, may comprise determining a steering wheel torque on basis of the steering shaft torque; determining a time derivative of the detected steering wheel torque; if the absolute value of the steering wheel torque is lower than a threshold torque limit and if the absolute value of the derivative of steering wheel torque is lower than a threshold derivative torque limit, a counter is increased by one count; if the absolute value of the steering wheel torque is higher or equal than a threshold torque limit, or/and if the absolute value of the derivative of steering wheel torque is higher or equal than a threshold derivative torque limit–, said counter is decreased by one count; and if said counter has a value equal to or higher than a threshold count limit the hands-off state is determined.

10 Claims, 5 Drawing Sheets

STEERING CONTROL APPARATUS FOR VEHICLE AND STEERING CONTROL METHOD

The invention concerns to a method for controlling a steering device with a steering power support means for a motor vehicle with at least one steerable road wheel, whereby the steering device comprising:

a steering shaft with a first end to adopt a steering wheel,
a control device controlling said power support means,
sensing means detecting a steering shaft torque introduced in said steering shaft,
means to determine a hands-off situation in which the driver does not introduce a torque into said steering shaft, wherein the steering power support means supports the steering effort of the driver on the basis of a driver demand introduced into the steering shaft.

Basically such steering systems are controlled by measuring the steering shaft torque which is introduced into the steering shaft by the driver. The power support means can be a power torque assist device, which supplies an assist torque into the steering device in relation to the steering shaft torque introduced by the driver. The power support means could also be a superimposing device, which supplies an additional angle to superimpose the steering angle demand by the driver with an additional angle.

Sometimes it happens that the driver takes the hands off the steering wheel and the steering shaft torque is more a result of the inertia in the system than of a driver influence. In such a hands-off state the steering situation should also be a clearly defined situation. Commonly the driver would expect that the road wheels will adjust in the straight forward direction themselves in such a hands-off state.

DESCRIPTION OF RELATED ART

U.S. Pat. No. 6,219,603 discloses a hands-off state determination procedure. The basic idea is that in a hands-off state the steering shaft torque vibrations are not dampened by the driver. When the magnitude of the torque is less than a predetermined threshold, the hands-off state is estimated.

EP1934083B1 discloses a hands-off state determination procedure in which the variants of the hand wheel steering torques are checked and if the variants exceed a threshold value, the hands-on state is determined. Otherwise if the variants are lower than a threshold value, the hands-off state is determined.

In use, with the known methods sometimes the hands-off state is determined erroneously although the driver has the hands on the wheel.

SUMMARY OF THE INVENTION

An object of the invention is to provide a method and a device to improve the recognition of the hands-off state.

The solution of the object consist of a method for controlling with following steps:

determining a steering wheel torque M on basis of the steering shaft torque;
determining a derivative of the detected steering wheel torque $\partial M/\partial t$;
if the absolute value of the steering wheel torque M is lower than a threshold torque limit $\epsilon 1$ and if the absolute value of the derivative $\partial M/\partial t$ of steering wheel torque M is lower than a threshold derivative torque limit $\epsilon 2$, a counter C is increased by one count, if the absolute value of the steering wheel torque M is higher or equal than a threshold torque limit $\epsilon 1$ or/and if the absolute value of the derivative of steering wheel torque $\partial M/\partial t$ is higher or equal than a threshold derivative torque limit $\epsilon 2$, said counter C is decreased by one count, if said counter C has a value higher or equal than a threshold count limit N1 the hands-off state is determined.

As a result, the hands-off state is determined with a high reliability. A simple checking of the steering shaft torque can not avoid some calculation problems at the determining the hands-off state. The invention reduces the errors in the hands-off state detection in case of a state in which the vehicle is running straight ahead and nearly no driver input is necessary.

By using the steering wheel torque instead of the steering shaft torque itself the influences of the inertia in the steering device are covered better.

In a preferred embodiment, the steering wheel torque can be calculated by an observer, which uses a vehicle model and a steering device model. The observer can improve the calculation results by using further measured values. Such values could be one or more of the following: vehicle speed, steering wheel rotational angle, power support means signals like a rotational position of a electric motor included into the power support means. Other values can also be used for the calculation.

In a preferred embodiment of the invention, the steering shaft torque is filtered by a low pass filter. Thereby the influences of vibrations or digital failures are reduced.

To improve the method, the switching from the hands-on state into the hands-off state is assumed at a different limit than the switching from the hands-off state into the hands-on state. Therefore the hands-on state is determined if said counter C has a value lower than a threshold low count limit N2. This low count limit N2 is preferred lower than the count limit N1. This reduces the possible vibrations between the hands-on state and the hands-off state. The low count limit N2 could be ½ or ⅓ of the count limit N1, or N2 could be zero.

To avoid problems with the situation that the counter C is decreased too much, a count stop limit N3 is preferably used. The counter C will not decrease further when the count stop limit N3 is reached. The count stop limit N3 could be zero or equal to the low count limit N2 or a value in between.

A further improvement consists in filtering the hands-off state value output by a low pass filter, especially preferred with a digital filter function. This feature reduces the vibrations between the hands-off and the hands-on state. Any changing between hands-on and hands-off state or between hands-off and hands-on state will output after a short time delay. In principle this low pass filtering checks whether the state value is not changed to often and the state would be not clear and safe detected. When the hands-off/hands-on state is changed a time delay by digital filtering is realized. During this time delay by the low pass filtering is "checked" whether the detected state value is changed again. When the state value is changed again, the state value output is not changed. The time constant for such filtering or delay should be preferred in the range between one and three seconds.

The threshold torque limit $\epsilon 1$ and/or the threshold derivative torque limit $\epsilon 2$ should be preferred adopted to the real steering device and vehicle parameters and/or the driver behavior and/or road parameters. Thus it is possible to calculate the threshold torque limit $\epsilon 1$ as combination of a basic torque limit $\epsilon 0$ and the variance of the steering wheel torque. Alternative or in combination it would be also possible to calculate the threshold derivative torque limit $\epsilon 2$ as combination of a basis derivative torque limit $\epsilon 3$ and the variance of the steering wheel torque. The variance—or standard deviation—of the steering wheel torque is reflecting the real driving situation, the vehicle parameters and the steering device parameters. In the simplest case the combination is set as multiplication.

DETAILED DESCRIPTION OF THE INVENTION

The determined hands-off/hands-on state can be used for different purposes. A signal or warning could be output to the driver in case of determining the hands-off state.

It is also possible to set an additional demand supplied to the power support means in case of determining the hands-off state. A preferred additional demand should be a demand to steer the vehicle in a straight ahead direction. Such demand could be an additional demand torque to the power torque assist device. Another demand could be an additional superimposing angle to a superimposing steering device.

BRIEF DESCRIPTION OF THE DRAWINGS

The invention will further be described on sample embodiments which are shown in the following figures:

Similar or similarly acting components are designated in the figures with the same reference numeral.

FIG. 1 shows a steering device to which a first embodiment of the invention can be applied. The steering device comprises a steering shaft 1 and a steering hand wheel 2 which is adopted to a first end of the steering shaft 1. A road wheel 4 is adjustable by a tie rod 3. The tie rod 3 is driven by a rack 5. A pinion 6 meshes with the rack 5. By rotating the pinion 6, said rack 5 is driven in longitudinal direction. The pinion 6 is driven by rotating the hand wheel 2 wherein the rotating torque is transmitted by the steering shaft 1. The steering device comprises further a power support means to introduce a support torque in to the steering actuator. A power support means 7 could in a first embodiment be arranged to act in longitudinal direction to the rack 5. Such power support means are well known and can use an electric motor 18, which is coupled over a belt drive to a ball screw mechanism to drive the rack 5 in longitudinal direction.

Figure 1:
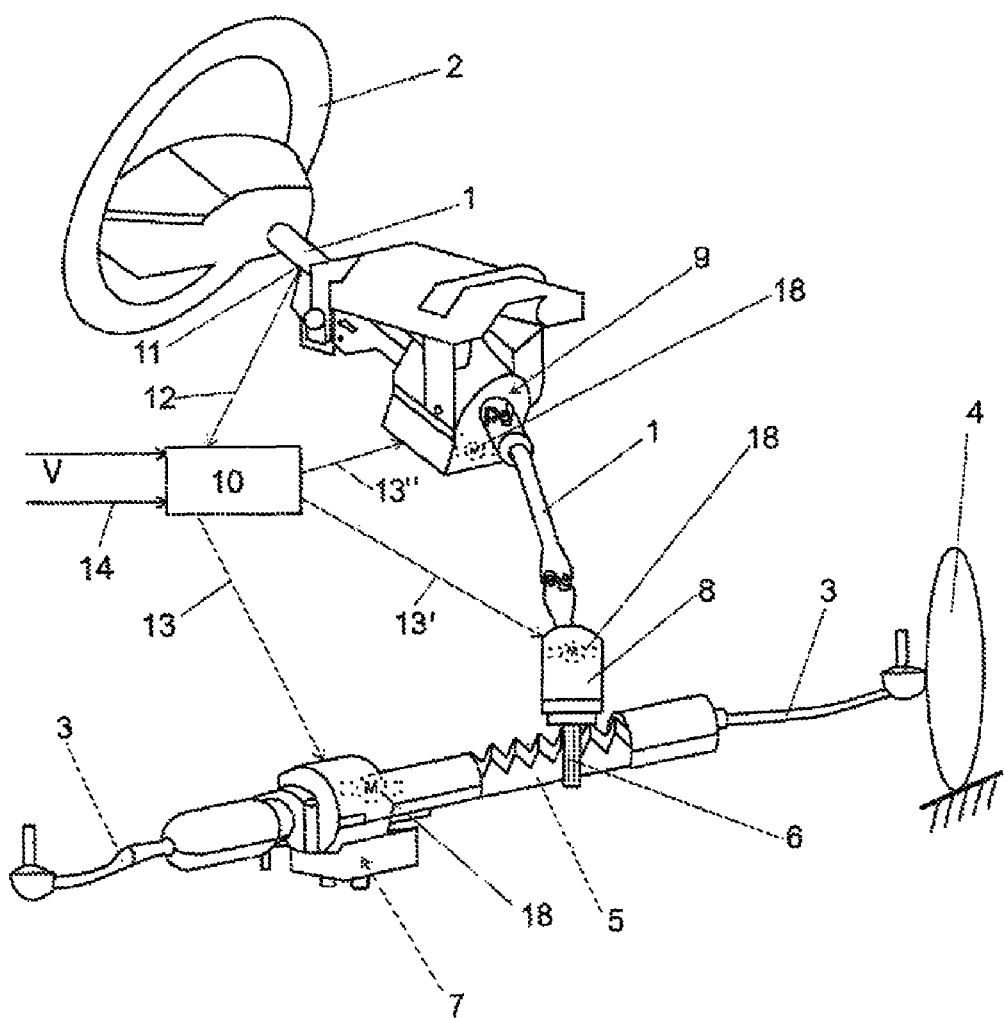
FIG. 1: a steering device with steering power support means according to the invention.

According to a second embodiment applicable to the invention, the power support means 8 is arranged to drive the pinion 6. In this case the power support mean could consist of an electric motor 18, which is coupled to the pinion 6 by a reduction gear.

In another embodiment applicable to the invention, the power support means 9 is arranged near the steering column to introduce the support, in this case a support torque, into the steering shaft 1. Also in this case the power support means could consist of an electric motor 18, which is coupled to steering shaft by a reduction gear.

A main control device 10 get signals 12 from a torque sensor 11 and other signals, par example the signal for the vehicle speed V, and calculates supply power values 13, 13', or 13" outputting them to the respective electric motor of the power support means 7 or power support means 8 or power support means 9 depending on the particular embodiment of the steering device. When the driver adjusts the steering wheel 2, he or she introduces a steering shaft torque into the steering device, which is measured by the steering torque sensor 11. Depending on the value of the steering torque signal 11, and other parameters of the vehicle par example the vehicle speed V and perhaps of other parameters 14 of the steering situation, the control device 10 calculates a power support moment to reduce the hand wheel torque for the driver.

As alternative or in combination with above described design could be one of the power support means a superimposing steering device. Such superimposing steering device superimposes the driver steering angle demand and an additional steering angle and output the sum to the road wheels.

All of these different embodiments are applicable to the invention because the arrangement of the power support means can be controlled by different embodiments of control devices and with different control methods.

Figure 2:
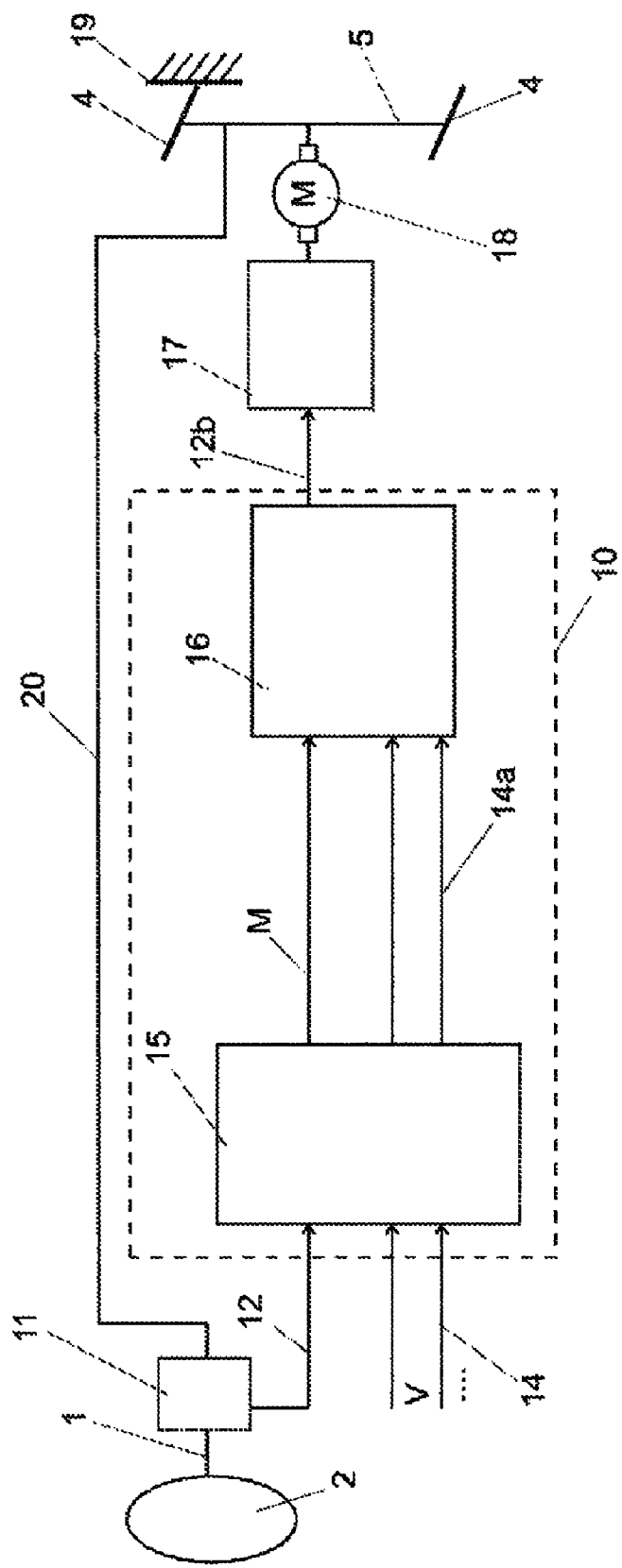
FIG. 2: a block diagram of a steering control device according to the invention.

FIG. 2 shows a first embodiment of the control device and control method for a steering device with steering power support means. The steering shaft torque value 12, which is introduced by the steering hand wheel 2 and measured by the torque sensor 11, is output to an observer device 15, which calculates state parameters for the steering system and/or vehicle system on the basis of a steering device model and/or vehicle model. If there are further measured values 14 available like vehicle speed V and/or vehicle acceleration and/or steering angle and/or steering angle speed and/or acceleration and/or other steering and/or vehicle values, they will also be fed into the observer device 15 of the main control device 10. In the observer device 15, many necessary or useful parameters of the vehicle and the steering system are calculated to improve the controlling of the steering power support means. On the basis of the steering shaft torque 12 the observer 15 calculates steering wheel torque M and other vehicle and/or steering parameters. The steering wheel torque M and other vehicle parameters 14a, which are a result of calculation in observer device 15 or are transferred from sensors are input into the control device 16. The control device 16 calculates a requested motor torque 12b and outputs it to the motor control device 17. The motor control device 17 outputs the motor current values to the coils of the motor 18. Usually such motor control device 17 works with a pulse width modulation (PWM), which is well known in the prior art. Other methods to control the electric motor 18 are also possible and applicable. The motor outputs the torque to adjust the rack 5 in a longitudinal direction to turn the road wheels 4. By the road surface 19 a back load in longitudinal direction is introduced into the rack 5. Through a mechanical coupling 20, feedback information is transferred back into the steering shaft 1, thereby closing the feedback control circuit.

Figure 3:
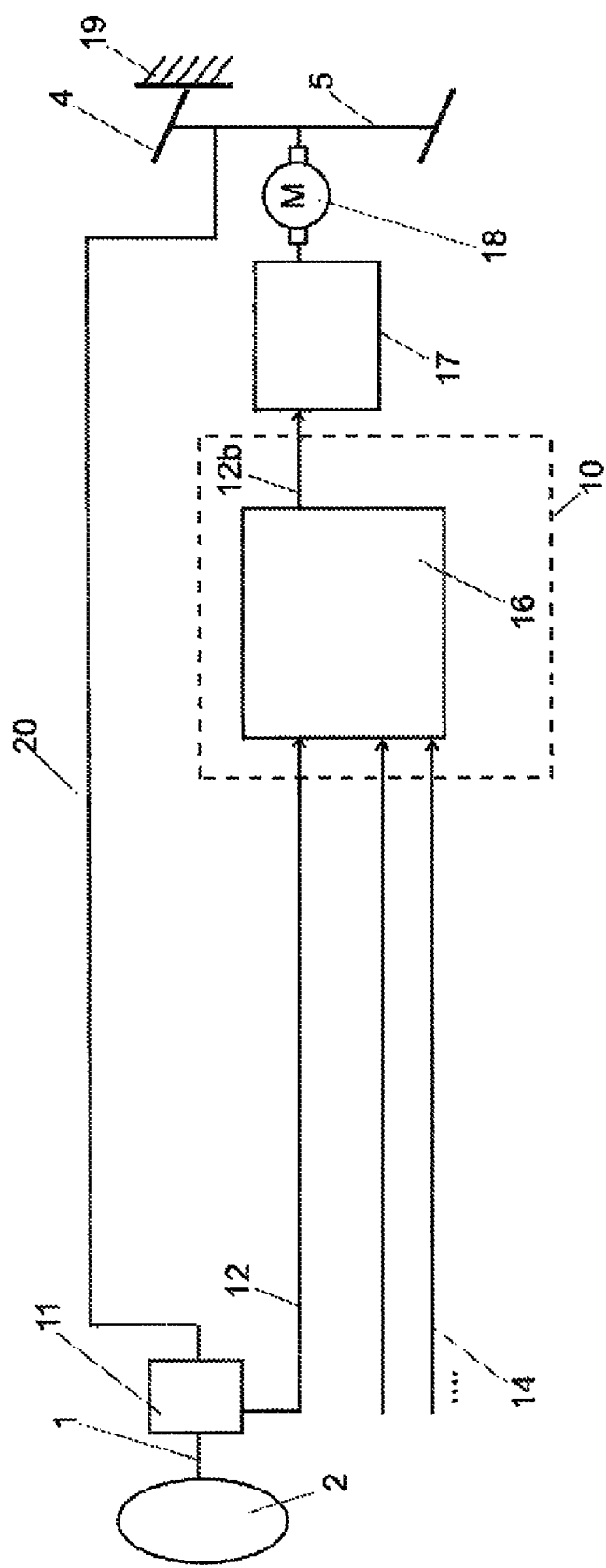
FIG. 3: a block diagram of a steering control device according to another embodiment of the invention.

FIG. 3 shows a second embodiment of the invention. As a difference to the first embodiment the main control device 10 does not include an observer. In the second embodiment the value of the directly measured steering shaft torque 12 is used like the steering wheel torque M and introduced into the control device 16. Further measured signals 14 are also introduced directly into the control device 16. According to this second embodiment the control result will not be as comfortable as it would be by using an observer. The influences of inertia and other vehicle parameters can be introduced into the control algorithm in reduced form only. To get a sufficient control result, relevant values as measured signals 14 like vehicle speed or other values must be available. The advantage of this embodiment is reduction of cost.

Figure 4:
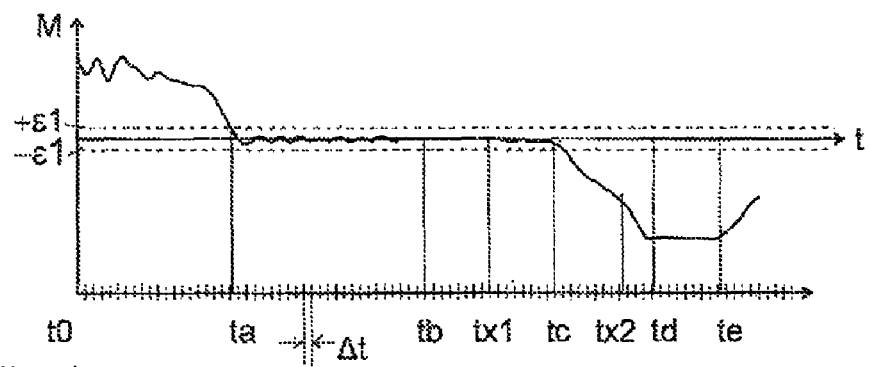
FIG. 4: a schematic graph of a sample for a hand wheel torque in relation to the time.

FIG. 4 shows a schematic graph of a hand wheel torque M in relation to the time t. In this sample at a start time t0 the hand wheel torque has a positive value, which is higher than a limit $\epsilon 1$. This could be a driving situation in which the driver steers the vehicle to the left hand direction. During the time interval between t0 and ta, the vehicle is driving more and more in straight ahead direction in this example. For the time period from the time ta to the time tc the driver do not introduce a high steering wheel torque into the steering device and the vehicle will drive nearly in the straight ahead direction. In the next time interval between the time tc and the time td the driver will steer the vehicle into right hand direction and the steering hand wheel torque will be negative and lower than the negative limit $-\epsilon 1$. At the next time interval between the time td and the time te the vehicle will go into the right hand direction with a nearly constant circle. The sample shows that in the time intervals between the time ta and the time tc the absolute value of the hand wheel torque M will be less than the threshold limit $\epsilon 1$. An electronic control device usually has a clock or duty cycle with a fixed interval. Therefore a relationship between the time and the duty cycle count can be determined. In the context of the invention, the term "time duration" is equivalent to a number of counts of a duty cycle.

Figure 5:
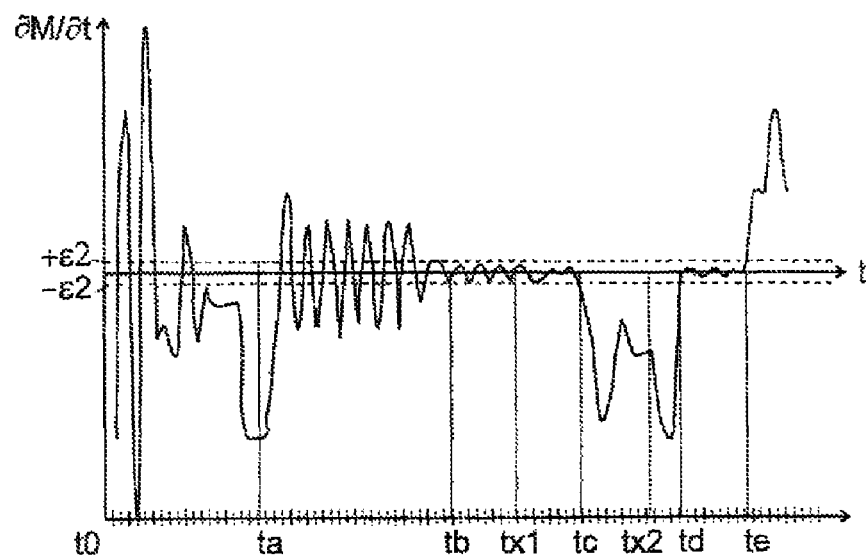
FIG. 5: a schematic graph of a sample for a derivative of hand wheel torque over time in relation to the time.

FIG. 5 shows the derivative of the hand wheel torque over the time $\partial M/\partial t$ in relation to the time t. This graph is corresponding to the graph in FIG. 4. It is shown that the derivative has big differences within short time intervals. The derivative expresses the compensation of any disturbances from the road by driver or any driver input vibrations. In this example it is shown that the driver, while driving the vehicle into the left hand direction at a nearly constant circle in the time interval from the time td up to time te, holds the steering wheel very stationary. The absolute value of the derivative of the steering hand wheel torque $\partial M/\partial t$ is less than a threshold derivative torque limit $\epsilon 2$. In the time interval between the time ta and the time tb, the driver drives the vehicle in straight forward direction, but he or she has to adjust the steering wheel very often with a small absolute value of the hand wheel torque M. This could be necessary as result from disturbances of the road, as example potholes. In the time interval between the time tb and the time tc the absolute value of the hand wheel torque M is less than a threshold torque limit $\epsilon 1$ and the absolute value of the derivative of the hand wheel torque $\partial M/\partial t$ is less than a threshold derivative torque limit $\epsilon 2$. In this time interval the counter will increase in every duty cycle $\Delta t$. If the time interval is long enough the counter will exceed the counting limit N1 and the hands-off state is determined. In all other time intervals either the absolute value of the hand wheel torque M is higher than the torque limit $\epsilon 1$, or the absolute value of the derivative of the hand wheel torque $\partial M/\partial t$ is higher than the time derivative torque limit $\epsilon 2$. In all these time intervals the counter will be decreased until the count stop limit N3 is reached.

Figure 6:
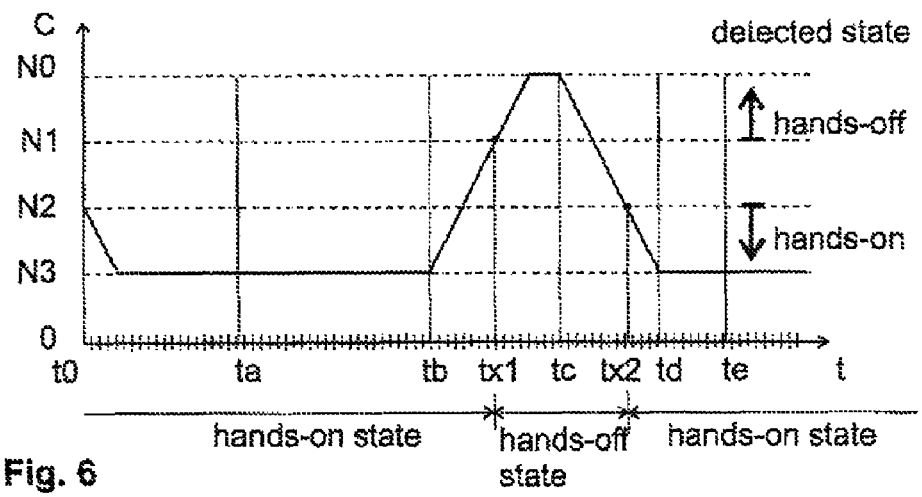
FIG. 6: a schematic graph of a sample for the counter.

FIG. 6 shows the counter as function of the time according to the hand wheel torque M of FIG. 4 and the derivative of FIG. 5. It is shown that the counter exceeds the count limit N1 at the time tx1. Sometimes later at the time tx2 the counter is decreased and later reach will the low count limit N2.

Between the time interval from the time tx1 to the time tx2 the hands-off state is output from the controller.

FIG. 6 also shows the count stop limit N3 at which the counter is not further decreased. Furthermore it is shown that the counter has a second maximum count limit N0 which is never exceed. In case of reaching this max count limit N0 the counter is no further increased. The direction signs describe the counter levels for the different hands-on/hands-off states. Below the time axis the detected state hands-on/hands-off is shown.

Figure 7:
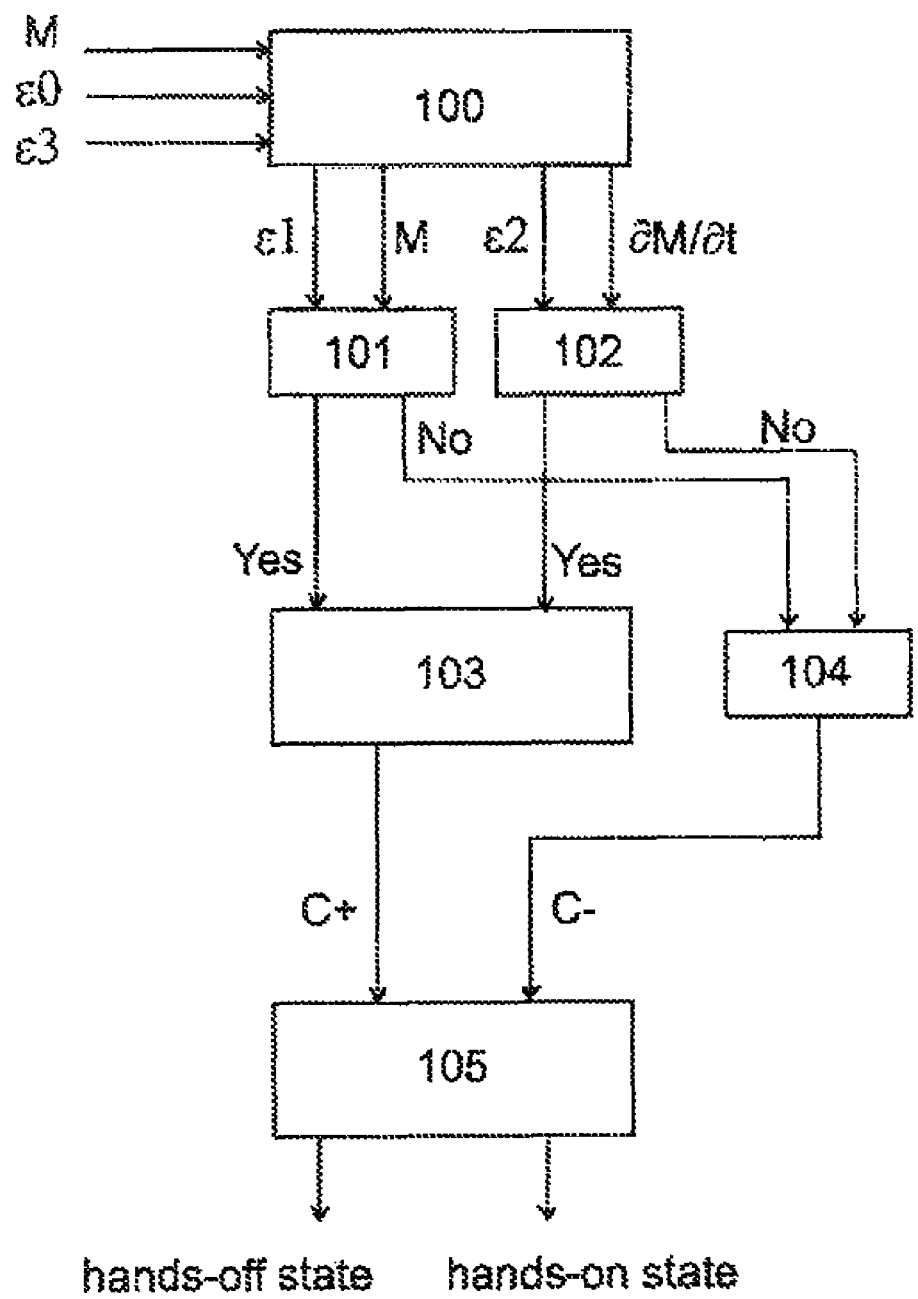
FIG. 7: a schematic block diagram of the method to determine the hands-off state.

FIG. 7 shows a block diagram for the controlling method. The input signal is hand wheel torque M which is the output signal from an observer 15. The basic torque limit $\epsilon 0$ and the basic derivative torque limit $\epsilon 3$ will be also fed into the control procedure. The limits should be stored in a memory in the control device 10. In a first step 100 the derivative of the hand wheel torque $\partial M/\partial t$ is calculated. Furthermore, the torque limit $\epsilon 1$ and the derivative torque limit $\epsilon 2$ are calculated in this first step. In block 101 the comparison is made between the hand wheel torque M and the threshold torque limit $\epsilon 1$. If the absolute value of the hand wheel torque M is less than the threshold torque limit $\epsilon 1$ the block 101 outputs the value "yes", which is input in the next block 103. Otherwise the value "no" is output to the block 104. In parallel in the block 102 the comparison between the derivative hand wheel torque $\partial M/\partial t$ with the threshold derivative torque $\epsilon 2$ is made. If the absolute value of the derivative of hand wheel torque $\partial M/\partial t$ is lower than the threshold derivative torque $\epsilon 2$, the block 102 outputs the value "yes" to block 103. Otherwise the value "no" is output to block 104. In block 103 it is checked whether the signal "yes" is input from block 101 and from block 102. If both signals are input into block 103, then the output signal C+ will be set to 1. If block 104 gets a signal "no", block 104 will output the output signal C− with the value 1. If block 103 will not get two signals "yes" from blocks 101 and 102, the output signal C+ from block 103 has the value 0. If the block 104 does not get any "no" signal, the output signal C− from block 104 will be 0. In block 105 the signal C+ and the negative signal C− are added to the actual counter value C. If the counter value exceed the threshold count limit N1, block 105 will output the hands-off state signal. If the value of the counter is less than the threshold low count limit N2, block 105 will output the hands-on state signal. In block 105 is also checked whether the counter would exceed the max count N0 or would be lower than the count stop limit N3. If the counter would exceed the max count N0, the counter will not be further increased and will hold on max count N0. If the counter would be lower than the count stop limit, the counter will not be further decreased. The following formulas will show the mathematic procedure in the block 105.

In Block 105 in principle the following steps are realized, wherein the duty cycle is defined by $\Delta t=t-(t-1)$.

First step: $C(t)=C(t-1)+C+-C-$
Second step: If $C(t)>N0$ then is set $C=N0$
Third step: if $C(t)<N3$ then is set $C=N3$
Fourth step: $C(t-1)$ is set equal to C
Fifth step: Check whether $C>N1$, if yes output the hands-off signal and go to the Eighth step
Sixth step: Check whether $C<N2$, if yes output the hands-on signal and go to the Eighth step
Seventh step: output the hands-off or the hands-on signal like the signal was at the previous duty cycle $t-1$.
Eighth step: proceed to step one.

The threshold values N0, N1, N2, N3 will be determined in test procedure during the design of the steering device and the vehicle. It is also possible to adjust these limits by calculation or look-up tables depending on vehicle parameters or learning in a neural network on the basis of the past behaviour. In a preferred embodiment of the invention the steering shaft torque 12 is filtered by a low pass filter. The time constant of the low pass filter should be in a preferred embodiment about one second or more preferred three seconds.

As alternative it is also possible to fitter the signal from the steering shaft torque 12 by digital filtering in the controller 10 or the observer 15. Nevertheless the invention could be also carried out with no filtering of the steering shaft torque signal 12.

It is also possible to use a filtered hand wheel torque M wherein this signal is calculated and afterwards filtered in the observer 15. Further it is preferred to use a filtered derivative of steering wheel torque $\partial M/\partial t$. By using such filtering operations with low pass filters, the calculation process to calculate the hands-off or the hands-on state will become more stable. In all cases filters should be low pass filters, which have time constants of preferred one second or more preferred three seconds.

As long as it is applicable or executable, it is possible to combine and/or mix and/or replace all singular features of the different embodiments or samples without leaving the invention.

The invention claimed is:

1. A method for controlling a steering device with steering power support means for a motor vehicle with at least one steerable road wheel, wherein the steering device includes a steering shaft with a first end to adopt a steering wheel, a control device controlling said power support means, sensing means detecting steering shaft torque introduced in said steering shaft, and means to determine a hands-off situation in which the driver does not introduce a torque into said steering shaft, wherein the steering power support means support the driver on the basis of a driver demand introduced into the steering shaft, the method comprising:
   determining a steering wheel torque on basis of the steering shaft torque;
   determining a time derivative of the detected steering wheel torque;
   if the absolute value of the steering wheel torque is lower than a threshold torque limit and if the absolute value of the derivative of steering wheel torque is lower than a threshold derivative torque limit, increasing a counter by one count;
   if the absolute value of the steering wheel torque is higher or equal than a threshold torque limit, or/and if the absolute value of the derivative of steering wheel torque is higher or equal than a threshold derivative torque limit, decreasing said counter by one count; and
   if said counter has a value equal to or higher than a threshold count limit, determining the hands-off state.

2. The method for controlling a steering device according to claim 1, wherein the steering shaft torque is filtered by a low pass filter.

3. The method for controlling a steering device according to claim 1, wherein if said counter has a value lower than a threshold low count limit the hands-on state is determined.

4. The method for controlling a steering device according to claim 1, wherein the hands-off state value output is filtered by a low pass filter.

5. The method for controlling a steering device according to claim 1, wherein the threshold torque limit is calculated as combination of a basic torque limit and the variance of the steering wheel torque.

6. The method for controlling a steering device according to claim 1, wherein the derivative torque limit threshold is calculated as combination of a basic derivative torque limit and the variance of the steering wheel torque.

7. The method for controlling a steering device according to claim 1, wherein in case of determining the hands-off state, a signal or warning message is output to the driver.

8. The method for controlling a steering device according to claim 1, wherein in case of determining the hands-off state, an additional signal in form of a torque demand signal is supplied to the power support means.

9. The method for controlling a steering device according to claim 1, wherein in case of determining the hands-off state, an additional signal in form of a superimposed steering angle signal is supplied to the power support means.

10. The method for controlling a steering device according to claim 8, wherein the additional signal is suitable to steer the vehicle in a straight ahead direction.

* * * * *